United States Patent Office

3,520,925
Patented July 21, 1970

---

3,520,925
ALKOXYMETHYLUREA HERBICIDES
Karl-Heinz Koenig, Ludwigshafen (Rhine), and Adolf Fischer, Mutterstadt, Pfalz, Germany, assignors to Badische Anilin- & Soda-Fabrik Aktiengesellschaft, Ludwigshafen (Rhine), Germany
No Drawing. Filed May 31, 1966, Ser. No. 553,681
Claims priority, application Germany, June 12, 1965, 1,542,688
Int. Cl. C07c *127/00*
U.S. Cl. 260—553         6 Claims

---

ABSTRACT OF THE DISCLOSURE

Herbicidal compounds of the formula

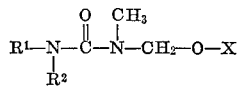

wherein $R^1$ denotes cyclohexyl, phenyl or phenyl substituted by at least one member selected from the group consisting of chlorine and methyl, $R^2$ denotes hydrogen or methyl and X denotes ethyl or chloroethyl.

---

The present invention relates to new urea derivatives. It relates particularly to new alkoxymethylurea derivatives which have valuable properties. The invention also relates to a method of controlling unwanted vegetation by using these urea derivatives.

It is an object of the invention to provide new alkoxymethylurea derivatives. Another object of the invention is to provide alkoxymethylurea derivatives which have a good herbicidal action. A further object of the invention is to provide a process for controlling unwanted vegetation with alkoxymethylurea derivatives, in which said derivatives have a strong herbicidal action.

It is known that a number of urea derivatives, for example N-p-chlorophenyl-N′-methyl-N′-methoxyurea (A), have herbicidal properties. Urea derivatives conventionally used in agriculture do not satisfy requirements in practice in all respects.

It is also known that N-p-chlorophenyl-N′-methyl-N′-methoxymethylurea (B) has herbicidal properties. This compound has not achieved any practical importance however.

We have found that urea derivatives having the general formula

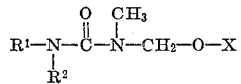

in which $R^1$ denotes a phenyl radical (which may be substituted by lower alkyl groups, halogen atoms, alkoxyl groups, a trifluoromethyl group or a halophenoxyl radical or two or more of these substituents at the same time) or a cycloaliphatic, bicycloaliphatic or tricycloaliphatic radical (which may bear alkyl groups as substituents), $R^2$ denotes a hydrogen atom or a methyl group and X denotes a linear or branched, saturated or unsaturated aliphatic radical (bearing one or more halogen atoms, alkoxy, aroxyl, nitro, cyano, carbalkoxyl, dialkylamino or thioalkoxyl groups as substituents), or a linear or branched, saturated or unsaturated aliphatic radical having more than one carbon atom, an aliphatic-aromatic radical or a cycloaliphatic radical (which may be substituted) have a good herbicidal action and a rapid onset of action.

The cycloaliphatic radical may have six to ten carbon atoms, examples being the cyclohexyl, cycloheptyl, cyclooctyl, cyclononyl, cyclodecyl, norbornyl, bicycloheptyl, bicclooctyl, tricyclodecyl or a cyclohexyl radical which may bear linear or branched alkyl radicals having one to four carbon atoms as substituents.

Examples of the lower alkyl groups are methyl, ethyl, propyl or isopropyl radicals. Examples of alkoxyl groups are methoxyl or ethoxyl groups. Examples of halophenoxyl radicals are p-chlorophenoxyl, p-bromophenoxyl or p-fluorophenoxyl radicals. Examples of halogen atoms are fluorine, chlorine or bromine atoms.

In accordance with the production of the α-ethercarbamyl halides from N-methyl-N-chloromethylcarbamyl chloride and a great variety of alcohols, the meaning of the radical X depends on the alcohol component, for example ethyl alcohol, n-propanol, isopropanol, 2-ethylhexanol, dodecyl alcohol, allyl alcohol, crotyl alcohol, propargyl alcohol, methylbutinol, butinol, trichloroallyl alcohol, ethylene chlorohydrin, propylene chlorohydrin, glycerol dichlorohydrin, ethylene cyanohydrin, trichloroethyl alcohol, ethylene bromohydrin, tribromoethyl alcohol, dimethylaminoethanol, diethylaminoethanol, N,N-dimethyl - 2 - hydroxypropylamine, β-mercaptoethanol, methyl glycol, ethyl glycol, propyl glycol, 1-methylthio-2-hydroxyethane, methyl glycollate, ethyl lactate, 2-nitropropanol-(1), β-phenylethyl alcohol, phenoxyethanol, benzyl alcohol, cyclohexanol, alkylcyclohexanols or cyclooctanol.

The production of the new urea derivatives may be carried out by conventional methods by reaction of hitherto unknown ethercarbamyl halides with primary or secondary amines in the presence of acid-binding substances. The ethercarbamyl halides may be prepared by reaction of a great variety of alcohols with N-methyl-N-chloromethylcarbamyl halides at room temperature. A great variety of substituents in the radical X of the urea derivatives are thus obtained.

Some of the amines on which the herbicidal ureas are based are as follows: aniline, 4-chloroaniline, 4-fluoroaniline, 4-bromoaniline, 3,4-dichloroaniline, p-toluidine, 4-ethylaniline, 4-isopropylaniline, m-trifluoromethylaniline, 3-chloro-4-methylaniline, p-anisidine, 2-amino-5-chlorotoluene, 2-chloro-5-trifluoromethylaniline, 2,5-dimethoxyaniline, 2,4-dimethoxy-5-chloroaniline, 2,5-dimethoxy-4-chloroaniline, cyclohexylamine, 4-methylcyclohexylamine, 4-ethylcyclohexylamine, 2,3-dimethylcyclohexylamine, 3,4-dimethylcyclohexylamine, 4-isopropyl-2-methylcyclohexylamine, cycloheptylamine, cyclooctylamine, cyclodecylamine, norbornylamine, dicycloheptylamine, tricyclodecylamine, bicyclo-(0,3,3)-octyl-2-amine, bicyclo - (3,2,1) - octyl-2-amine, bicyclo-(0,3,3)-octyl-1-amine, tricyclo-(2,1,0,3)-decyl-2-amine.

Production of the N-methyl-N-cyclohexoxymethyl-N′-phenylurea will now be given by way of explanation:

61 parts of N-methyl-N-cyclohexoxymethylcarbamyl chloride is dripped at 70° to 80° C. into a mixture of 40 parts by weight of triethylamine and 28 parts by weight of aniline in 200 parts by weight of cyclohexane. Three hours later 150 parts by weight of water is added, the cyclohexanone layer is separated, dried and concentrated. After recrystallization from cyclohexane, 68 parts by weight of the urea is obtained having the melting point of 93° to 94° C.

The following are examples of urea derivatives in accordance with this invention; they are numbered for easier reference later in the specification; the numbers in brackets give the melting points of the derivatives (RT denotes an oil at room temperature) or, in a few cases, the boiling points, preceded by "B.P." and the pressure in mm. Hg.

(1) N-(p-chlorophenyl)-N′-methyl-N′-propoxymethyl-urea (73° to 75° C.)
(2) N-phenyl-N′-methyl-N′-isobutoxymethylurea (78° to 80° C.)

(3) N-cyclooctyl-N'-methyl-N'-ethoxymethylurea (52° to 54° C.)
(4) N-cyclooctyl-N'-methyl-N'-isopropoxymethylurea (43° to 44° C.)
(5) N-cyclooctyl-N'-methyl-N'-butinoxymethylurea (42° to 44° C.)
(6) N-phenyl-N'-methyl-N'-ethoxymethylurea (68° to 70° C.)
(7) N-(p-ethylphenyl)-N'-methyl-N'-ethoxymethylurea (49° to 50° C.)
(8) N-(p-methylphenyl)-N'-methyl-N'-ethoxymethylurea (68° to 70° C.)
(9) N-phenyl-N'-methyl-N'-($\beta$-chloroethoxy)-methylurea (48° to 50° C.)
(10) N-(3,4-dichlorophenyl)-N'-methyl-N'-($\beta$-chloroethoxy)-methylurea (62° to 65° C.)
(11) N-(p-methylphenyl)-N'-methyl-N'-propoxymethylurea (67° to 69° C.)
(12) N-(p-ethylphenyl)-N'-methyl-N'-propoxymethylurea (61° to 63° C.)
(13) N-(3,4-dichlorophenyl)-N'-methyl-N'-propoxymethylurea (71.5° to 73° C.)
(14) N - (3 - chloro - 4 - methylphenyl) - N' - methyl-N'-propoxymethylurea (34° to 36° C.)
(15) N - phenyl - N' - methyl - N' - propoxymethylurea (53° to 55° C.)
(16) N - (p - chlorophenyl) - N' - methyl - N' - propoxymethylurea (73° to 75° C.)
(17) N - (p - chlorophenyl) - N' - methyl - N' - propenoxymethylurea (65° to 68° C.)
(18) N - (3 - chloro - 4 - methylphenyl) - N' - methyl-N'-propenoxymethylurea (RT)
(19) N - phenyl - N' - methyl - N' - propenoxymethylurea (52° to 54° C.)
(20) N - methyl - N - phenyl - N' - methyl - N' - propenoxymethylurea (B.P. 0.2 115° to 117° C.)
(21) N - phenyl - N - methyl - N' - propinoxymethylurea (53° to 56° C.)
(22) N - (p - chlorophenyl) - N' - methyl - N' - propinoxymethylurea (70° to 71° C.)
(23) N - (3 - chloro - 4 - methylphenyl) - N' - methyl-N'-propinoxymethylurea (41° to 43° C.)
(24) N - (p - ethylphenyl) - N' - methyl - N' - propinoxymethylurea (46° to 48° C.)
(25) N - (p - methylphenyl) - N' - methyl - N' - isopropoxymethylurea (79° to 81° C.)
(26) N - (p - chlorophenyl) - N' - methyl - N' - isopropoxymethylurea (87° to 89° C.)
(27) N - phenyl - N - methyl - N' - methyl - N' - isopropoxymethylurea (B.P. 0.5 121° to 123° C.)
(28) N - (3 - chloro - 4 - methylphenyl) - N' - methyl-N'-isopropoxymethylurea (61° to 62° C.)
(29) N - (p - ethylphenyl) - N' - methyl - N' - isopropoxymethylurea (58° to 60° C.)
(30) N - phenyl - N' - methyl - N' - isopropoxymethylurea (92° to 94° C.)
(31) N - [p - (p' - chlorophenoxy) - phenyl] - N' - methyl-N'-isopropoxymethylurea (86° to 88° C.)
(32) N - (p - chlorophenyl) - N' - methyl - N' - isobutoxymethylurea (79° to 80° C.)
(33) N - (p - ethylphenyl) - N' - methyl - N' - butoxymethylurea (66° to 69° C.)
(34) N - (p - methylphenyl) - N' - methyl - N' - butoxymethylurea (151° to 153° C.)
(35) N - (3 - chloro - 4 - methylphenyl) - N' - methyl-N'-butoxymethylurea (37° to 39° C.)
(36) N - (p - chlorophenyl) - N' - methyl - N' - (1 - methyl-2-chloroethoxy)-methylurea (50° to 53° C.)
(37) N - (p - methylphenyl) - N' - methyl - N' - isobutoxymethylurea (93° to 95° C.)
(38) N - (3 - chloro - 4 - methylphenyl) - N' - methyl-N'-isobutoxymethylurea (86° to 88° C.)
(39) N - phenyl - N' - methyl - N' - butinoxymethylurea (100° to 102° C.)
(40) N - (3 - chloro - 4 - methylphenyl - N' - methyl - N'-butinoxymethylurea (68° to 70° C.)
(41) N - cyclooctyl - N' - methyl - N' - ethoxymethylurea (52° to 54° C.)
(42) N - cyclohexyl - N' - methyl - N' - isopropoxymethylurea (64° to 65° C.)
(43) N - cyclooctyl - N' - methyl - N' - isopropoxymethylurea (43° to 44° C.)
(44) N - cyclohexyl - N' - methyl - N' - propenoxymethylurea (57° to 59° C.)
(45) N - cyclohexyl - N' - methyl - N' - propinoxymethylurea (35° to 37° C.)
(46) N - cyclohexyl - N' - methyl - N' - (1 - methyl - 2-chloroethoxymethyl)-urea (42° to 44° C.)
(47) N - (p-bromophenyl) - N' - methyl - N' - ethoxymethylurea (81° to 83° C.)
(48) N - (p - chlorophenyl) - N' - methyl - N' - ethoxymethylurea (82° to 85° C.)
(49) N - [p - (p' - chlorophenoxy) - phenyl] - N' - methyl - N' - ethoxymethylurea (60° to 63° C.)
(50) N - cyclohexyl - N' - methyl - N' - ethoxymethylurea (68° to 71° C.)
(51) N - phenyl - N - methyl - N' - methyl - N' - ethoxymethylurea (B.P. 2.0 131° to 135° C.)
(52) N - (p - bromophenyl) - N' - methyl - N' - propoxymethylurea (62° to 66° C.)
(53) N - [p - (p' - chlorophenoxy) - phenyl] - N' - methyl-N'-propoxymethylurea (63.5° to 66° C.)
(54) N - cyclohexyl - N' - methyl - N' - propoxymethylurea (27° to 31° C.)
(55) N - cyclooctyl - N' - methyl - N' - propoxymethylurea (27° to 28° C.)
(56) N - phenyl - N - methyl - N' - methyl - N' - propoxymethylurea (B.P. 1.8 144° to 146° C.)
(57) N - (p - ethylphenyl) - N' - methyl - N' - isobutoxymethylurea (91° to 94° C.)
(58) N - (p - bromophenyl) - N' - methyl - N' - isobutoxymethylurea (74° to 77° C.)
(59) N - (3,4 - dichlorophenyl) - N' - methyl - N' - isobutoxymethylurea (88° to 92° C.)
(60) N - [p - (p' - chlorophenoxy) - phenyl] - N' - methyl-N'-isobutoxymethylurea (85° to 87° C.)
(61) N - cyclohexyl - N' - methyl - N' - isobutoxymethylurea (62° to 63.5° C.)
(62) N - cyclooctyl - N' - methyl - N' - isobutoxymethylurea (48° to 50° C.)
(63) N - phenyl - N - methyl - N' - methyl - N' - isobutoxymethylurea (B.P. 0.4 121° to 124° C.)
(64) N - (p - bromophenyl) - N' - methyl - N' - butoxymethylurea (43° to 48° C.)
(65) N - (p - chlorophenyl) - N' - methyl - N' - butoxymethylurea (RT)
(66) N - [p - (p' - chlorophenoxy) - phenyl] - N' - methyl-N'-butoxymethylurea (87° to 90° C.)
(67) N - cyclohexyl - N' - methyl - N' - butoxymethylurea (34° to 38° C.)
(68) N - cyclooctyl - N' - methyl - N' - butoxymethylurea (50° to 53° C.)
(69) N - phenyl - N - methyl - N' - methyl - N' - butoxymethylurea (B.P. 0.2 112° to 114° C.)
(70) N - (p - methylphenyl) - N' - methyl - N' - propenoxymethylurea (38° to 44° C.)
(71) N - (p - ethylphenyl) - N' - methyl - N' - propenoxymethylurea (crude product RT)
(72) N - (3 - chloro - 4 - methylphenyl) - N' - methyl-N'-propenoxymethylurea (RT)
(73) N - [p - (p' - chlorophenoxy) - phenyl] - N' - methyl-N'-propenoxymethylurea (70° to 72° C.)
(74) N - cyclooctyl - N' - methyl - N' - propenoxymethylurea (64° to 66° C.)
(75) N - (p - methylphenyl) - N' - methyl - N' - propinoxymethylurea (64° to 67° C.)
(76) N - (p - ethylphenyl) - N' - methyl - N' - propinoxymethylurea (45° to 48° C.)

(77) N - (3,4 - dichlorophenyl) - N' - methyl - N' - propinoxymethylurea (50° to 55° C.)
(78) N - cyclooctyl - N' - methyl - N' - propinoxymethylurea (47° to 49° C.)
(79) N - phenyl - N - methyl - N' - methyl - N' propinoxymethylurea (B.P. 0.1 128° to 130° C.)
(80) N - cyclohexyl - N' - methyl - N' - butinoxymethylurea (45° to 46.5° C.)
(81) N - phenyl - N - methyl - N' - methyl - N' - butinoxymethylurea (B.P. 0.3 123° to 126° C.)
(82) N-phenyl-N'-methyl-N'-(1,1-dimethylpropionoxy)-methylurea (RT)
(83) N-(p-methylphenyl)-N'-methyl-N'-(1,1-dimethylpropionoxy)methylurea (41° to 47° C.)
(84) N-cyclohexyl-N'-methyl-N'-(1,1-dimethylpropionoxy)-methylurea (36° to 38° C.)
(85) N-(p-methylphenyl)-N'-methyl-N'-($\beta$-chloroethoxy)-methylurea (58° to 62° C.)
(86) N-(p-ethylphenyl)-N'-methyl-N'-($\beta$-chloroethoxy)-methylurea (40° to 44° C.)
(87) N-(3,4-dichlorophenyl)-N'-methyl-N'-($\beta$-chloroethoxy)-methylurea (100° to 103° C.)
(88) N-cyclohexyl-N'-methyl-N'-($\beta$-chloroethoxy)-methylurea (45° to 46.5° C.)
(89) N-cyclooctyl-N'-methyl-N'-($\beta$-chloroethoxymethyl)-urea (39° to 40° C.)
(90) N-phenyl-N-methyl-N'-methyl-N'-($\beta$-chloroethoxy)-methylurea (43° to 50° C.)
(91) N-(p-ethylphenyl)-N'-methyl-N'-(1-methyl-2-chloroethoxymethyl)-urea 46° to 50° C.)
(92) N-(3-chloro-4-methylphenyl)-N'-methyl-N'-(1-methyl-2-chloroethoxy)-methylurea (37° to 48° C.)
(93) N-(p-bromophenyl)-N'-methyl-N'-(1-methyl-2-chloroethoxy)methylurea (very low)
(94) N-phenyl-N-methyl-N'-methyl-N'-(1-methyl-2-chloroethoxymethyl)-urea (B.P. 0.15 127° to 128° C.)
(95) N-phenyl-N'-methyl-N'-[$\beta$-(methoxy)-ethoxymethyl]-urea (crude RT)
(96) N-p(-methylphenyl)-N'-methyl-N'-[$\beta$-(methoxy)-ethoxymethyl]-urea (RT)
(97) N-(p-ethylphenyl)-N'-methyl-N'-[$\beta$-(methoxy)-ethoxymethyl]-urea (RT)
(98) N-(p-chlorophenyl)-N'-methyl-N'-[$\beta$-(methoxy)-ethoxymethyl]-urea (RT)
(99) N-[p'-(p-chlorophenoxy)-phenyl]-N'-methyl-N'-[$\beta$-(methoxy)-ethoxymethyl]-urea (56° to 63° C.)
(100) N-penyl-N-methyl-N'-methyl-N'-[$\beta$-(methoxy)-ethoxymethyl]-urea (B.P. 0.4 139° to 142° C.)
(101) N-[p-(p'-chlorophenoxy)-phenyl]-N'-methyl-N'-[$\beta$-(ethoxy)-ethoxymethyl]-urea (62° to 65° C.)
(102) N-cyclohexyl-N'-methyl-N'-[$\beta$-(ethoxy)-ethoxymethyl]-ureau (RT)
(103) N-cyclooctyl-N'-methyl-N'-[$\beta$-(ethoxy)-ethoxymethyl]-urea (B.P. 1.5 177° to 179° C.)
(104) N-(p-chlorophenyl)-N'-methyl-N'-cyclohexoxymethylurea (100° to 101° C.)
(105) N-(3-chloro-4-methylphenyl)-N'-methyl-N'-($\beta$-chloroethoxy)-methylurea
(106) N-(p-chlorophenyl)-N'-methyl-N'-($\beta$-chloropropoxy)-methylurea
(107) N-cyclohexyl-N'-methyl-N'-($\beta$-chloropropoxymethyl)-urea.

All these compounds may be purified by recrystallization or by distillation. Usually the compounds are obtained in sufficient purity to be used direct as herbicides.

The agents for regulating plant growth in accordance with this invention may be used as solutions, emulsions, suspensions or dusts. The form in which they are used depends entirely on the purpose for which they are being used; in all cases they should ensure a fine distribution of the active ingredient.

Mineral oil fractions having medium to high boiling point, such as kerosene or diesel oil, and also coal tar oils or animal oils, and also tetrahydronaphthalene and alkylated naphthalenes are suitable for the production of solutions capable of being directly sprayed, the active ingredients according to this invention being added thereto, if necessary using suitable solubilizers, for example xylene. Solutions in low boiling point solvents, such as alcohols, for example ethanol or methylcyclohexanol; ketones, for example acetone or cyclohexanone; ethers, for example tetrahydrofuran or dioxane; aromatic hydrocarbons, for example benzene, toluene, xylene; chlorinated hydrocarbons, for example chloroform, carbon tetrachloride, tetrachloroethane, ethylene chloride or trichloroethylene, are less suitable for direct use than for combination with suitable emulsifying agents for the production of concentrates which can easily be converted into aqueous emulsions.

Aqueous forms of applications may be prepared from emulsion concentrates, pastes or wettable powders (spray powders) by adding water.

The active ingredients, as such or in one of the abovementioned solvents, may be homogenized in water by means of emulsifying or dispersing agents for the production of emulsions. The emulsifying and dispersing agents may be cation-active emulsifying agents, for example quaternary ammonium compounds, or anion-active, for example soaps, soft soaps, aliphatic long chain sulfuric acid monoesters, or aliphatic-aromatic sulfonic acids, ligninsulfonic acid, long chain alkoxyacetic acids, and also nonionic emulsifying agents, for example polyethylene polyethers of fatty alcohols and polyethylene oxide condensation products.

It is also possible to make concentrates from active ingredients, emulsifying and dispersing agents and if desired solvents, these concentrates being suitable for dilution with water. Compounds having adequate basicity may be converted into salts with acids and the salts used in aqueous solution.

Dusts may be prepared by mixing or common grinding of the active ingredient with a solid carrier. Examples of suitable carriers are: talc, diatomaceous earth, kaolin, bentonite, calcium carbonate, calcium phosphate, boric acid, and also wood flour, cork dust, coal and other minerals. Granulates capable of being scattered may be obtained for example by using ammonium sulfate as the carrier. On the other hand the carrier may be impregnated with solutions of the active ingredients in liquid solvents. Powder preparations or pastes may be obtained by adding wetting agents and protective colloids and the products may be suspended in water and used as sprays. The various forms of application may be better adapted for the various purposes of application in a conventional way by adding substances which improve distribution, adhesion, rain resistance and penetrating power, such as fatty acids, resins, wetting agents, glue or alginates. Similarly the biological spectrum may be widened by adding substances having bactericidal, fungicidal or plant growth regulating properties and also by combination with fertilizers.

The invention is illustrated by the following examples.

EXAMPLE 1

Seeds of barley (*Hordeum vulgare*), wheat (*Triticum vulgare*), Indian corn (*Zea mays*), potatoes (*Solanum tuberosum*), annual meadow grass (*Poa annua*), slender foxtail (*Alopecurus myosuroides*), wild mustard (*Sinapis arvensis*), chickweed (*Stellaria media*), white goosefoot (*Chenopodium album*) and gallant soldier (*Galinsoga parviflora*) are sown in plastic pots having a diameter of 8 cm. and treated on the same day with active ingredients 48, 49, 50, 51 and 105 and, for comparison, with substances (A) and (B). In each case the rate of application is 1.5 kg. of active ingredient per hectare dispersed in an amount of water equivalent to 500 liters per hectare. Four weeks later it is evident that compounds 48, 49, 50, 51 and 105 have better plant compatibility in the case of the above-mentioned crop plants than (A) and (B). The results of the experiment are given in the following table, 0 denoting no damage and 100 denoting total destruction:

| | Active ingredient | | | | | | |
|---|---|---|---|---|---|---|---|
| | 48 | 49 | 50 | 51 | 105 | (A) | (B) |
| Crop plants: | | | | | | | |
| Barley | 10 | 10 | 0-10 | 0-10 | 0 | 10-20 | 30-40 |
| Wheat | 10 | 10 | 10 | 0-10 | 0-10 | 20-30 | 30-40 |
| Indian corn | 0-10 | 10 | 0-10 | 0-10 | 0 | 10-20 | 30 |
| Potatoes | 10 | 10 | 0-10 | 0-10 | 0 | 10-20 | 30 |
| Unwanted plants: | | | | | | | |
| Annual meadow grass | 60 | 80 | 70 | 60-70 | 60 | 60 | 50 |
| Slender foxtail | 70 | 70 | 70 | 60-70 | 70 | 60 | 40-50 |
| Wild mustard | 90-100 | 90-100 | 100 | 90-100 | 90-100 | 90-100 | 90 |
| Chickweed | 90-100 | 90-100 | 90-100 | 90 | 90 | 90-100 | 80-90 |
| White goosefoot | 90-100 | 90-100 | 100 | 90-100 | 90 | 90-100 | 90 |
| Gallant soldier | 90 | 90-100 | 90-100 | 90-100 | 90 | 90 | 90 |

The following compounds have the same biological action as 48–51 and 105: 2–6, 9, 11, 12, 15–17, 19, 21, 22, 25–30 and 32.

EXAMPLE 2

Plants from seeds such as are used in Example 1 (with the exception of potatoes) are treated at a growth height of 4 to 17 cm. with compounds 48–51 and 105 and for comparison with (A) and (B). The rate of application is 1 kg. of active ingredient per hectare dispersed in an amount of water equivalent to 500 liters per hectare. Three to four weeks later it is evident that compounds 48–51 and 105 have better compatibility with barley, wheat and Indian corn than (A) and (B). The experimental results are given in the following table, 0 denoting no damage and 100 denoting total destruction:

| | Active ingredient | | | | | | |
|---|---|---|---|---|---|---|---|
| | 48 | 49 | 50 | 51 | 105 | (A) | (B) |
| Crop plants: | | | | | | | |
| Barley | 10 | 10 | 10 | 10 | 0 | 20-30 | 20-30 |
| Wheat | 0-10 | 10 | 10 | 10 | 0-10 | 20-30 | 30 |
| Indian corn | 0-10 | 10-15 | 10 | 0-10 | 10 | 30 | 30 |
| Unwanted plants: | | | | | | | |
| Annual meadow grass | 70-80 | 70 | 80 | 70 | 70 | 60-70 | 50 |
| Slender foxtail | 70-80 | 70 | 70-80 | 70 | 70-80 | 50-60 | 50 |
| Wild mustard | 100 | 100 | 100 | 90-100 | 100 | 90 | 90 |
| Chickweed | 90 | 90 | 90-100 | 90 | 90-100 | 80 | 80-90 |
| White goosefoot | 90-100 | 90-100 | 90-100 | 90-100 | 90-100 | 90 | 80-90 |
| Gallant soldier | 90-100 | 90-100 | 90-100 | 90-100 | 90-100 | 90 | 80-90 |

The following compounds exhibit the same biological action as 48–51 and 105: 2, 5, 6–17, 19–38, 40, 45 and 46.

EXAMPLE 3

An agricultural cultivated area, which has been sown with white goosefoot (*Chenopodium album*), chickweed (*Stellaria media*), gallant soldier (*Galinsoga, parviflora*), wild mustard (*Sinapis arvensis*), small nettle (*Urtica urens*), annual meadow grass (*Poa annua*), slender foxtail (*Alopecurus myosuroides*) and orchard grass (*Dactylis glomerata*) is sprayed after the sowing with active ingredients 48–51 and 105 and, for comparison, with 2 - chloro - 4,6 - bis - (ethylamino)-s-triazine (C), each in an amount equivalent to the rate of 5 kg. of active ingredient per hectare. The active ingredients are dispersed in an amount of water equivalent to 500 liters per hectare. After emergence of the broadleafed and grass weeds, it is evident that there has been stronger herbicidal action on the area sprayed with 48–51 and 105 than on the area sprayed with (C). Three weeks later almost all the plants have withered.

The same biological action as 48–51 and 105 is exhibited by the following compounds: 1, 2, 5, 6, 9, 11, 12, 15, 16, 19, 21, 22, 25–30, 32, 34 and 41–43.

EXAMPLE 4

An agricultural cultivated area which is overgrown with the same plants as were shown in Example 3 is sprayed with the same active ingredients (48–51, 105 and (C)) at the same rate as in Example 3. The broadleafed and grass weeds have a growth height of 4 to 10 cm. at the time of the treatment. Some days later the plants treated with 48–51 and 105 exhibit a good herbicidal action while the plants treated with comparison agent (C) show normal growth. Almost all the plants have completely withered three to four weeks later.

The same biological action as 48–51 and 105 is exhibited by the following compounds: 2, 5, 6–35, 37–45, 106 and 107.

We claim:
1. A urea derivative of the formula

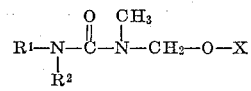

wherein $R^1$ denotes cyclohexyl, phenyl or phenyl substituted by at least one member selected from the group consisting of chlorine and methyl, $R^2$ denotes hydrogen or methyl and X denotes ethyl or chloroethyl.

2. N - (p - chlorophenyl) - N' - methyl-N'-ethoxymethylurea.

3. N - (3 - chloro - 4 - methylphenyl) - N'-methyl-N'-(β-chloroethoxy)methylurea.

4. N - phenyl - N - methyl - N' - methyl - N' - ethoxymethylurea.

5. N - cyclohexyl - N' - methyl - N' - ethoxymethylurea.

6. N-phenyl-N'-methyl-N'-ethoxymethylurea.

References Cited

UNITED STATES PATENTS 3,125,601  3/1964  Goebel _____ 260—553
3,072,719  1/1963  Beaver et al. _____ 260—553

BERNARD HELFIN, Primary Examiner

M. W. GLYNN, Assistant Examiner

U.S. Cl. X.R.

71—119, 120